(12) United States Patent  
Kim

(10) Patent No.: US 6,443,031 B1
(45) Date of Patent: Sep. 3, 2002

(54) SLIDE COVER UNIT FOR A SHIFT LEVER ASSEMBLY

(75) Inventor: Hyung-Suk Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/565,251

(22) Filed: May 5, 2000

(30) Foreign Application Priority Data

Nov. 5, 1999 (KR) .............................................. 99-48813

(51) Int. Cl.⁷ .............................. G05G 1/00; B60K 20/00
(52) U.S. Cl. ......................... 74/566; 74/523; 74/473.18
(58) Field of Search .......................... 74/491, 473.19, 74/473.18, 523, 477, 566

(56) References Cited

U.S. PATENT DOCUMENTS

| 3,473,404 | A | * | 10/1969 | Ross ............................ 74/491 |
| 3,985,095 | A | * | 10/1976 | Nurse ..................... 116/124 M |
| 4,326,432 | A | * | 4/1982 | Miller .......................... 74/475 |
| 4,630,499 | A | * | 12/1986 | Hopkins .................... 74/473 R |
| 4,991,460 | A | * | 2/1991 | Shirahama et al. ............ 74/523 |
| 5,186,069 | A | * | 2/1993 | Asano et al. .................. 74/477 |
| 5,505,103 | A | * | 4/1996 | Nordstrom et al. ......... 74/473 P |
| 5,791,197 | A | * | 8/1998 | Rempinski et al. ....... 74/743.18 |
| 5,848,855 | A | * | 12/1998 | Roossien ..................... 403/329 |
| 5,924,333 | A | * | 7/1999 | Futschik et al. ............... 74/566 |

FOREIGN PATENT DOCUMENTS

| JP | 3-528 | * | 1/1991 | .................. 74/566 |
| JP | 11-115529 | * | 4/1999 | .................. 74/566 |

* cited by examiner

*Primary Examiner*—Vinh T. Luong
(74) *Attorney, Agent, or Firm*—Christie, Parker & Hale, LLP

(57) ABSTRACT

A slide cover unit of a dual mode shift lever assembly is provided to cover a guide groove formed in an indicator panel in order to isolate an interior of a housing regardless of movement direction of the shift lever. The slide cover includes a first cover plate slidably mounted under the indicator panel for covering the guide groove, a pivot pin fixed on a lower surface of the first cover plate, and a second cover plate pivotally mounted on the pivot pin as an auxiliary cover for the guide groove.

5 Claims, 7 Drawing Sheets

PRIOR ART

SLIDE COVER UNIT FOR A SHIFT LEVER ASSEMBLY

BACKGROUND OF THE INVENTION

1. Field of the Invention

The present invention relates to a shift lever assembly for an automatic transmission, and in particular, to a slide cover unit of a dual mode shift lever assembly for covering a guide groove formed on an indicator panel.

2. Background of the Invention

Typically, a shift lever assembly for an automatic transmission includes an indicator panel having a guide groove, a shift lever passing through the guide groove so as to move along the guide groove, and a slide cover provided in the lower surface of the indicator panel for covering the guide groove such that the interior of the shift lever assembly cannot be seen.

One example of a prior slide cover unit for a shift lever assembly is schematically illustrated in FIG. 7. As shown in FIG. 7, the slide cover comprises a first cover plate 50, located under the indicator panel (not shown), which slides forward and rearward with respect to the direction of travel of a vehicle, and a second cover plate 53 which is guided by a pair of guide rails 51 and 51' formed on a lower surface of the first cover plate 50 so as to slide in left and right directions with respect to the direction of travel of the vehicle. An elongated hole 52 is formed in an approximate center of the first cover plate 50, the elongated hole 52 provided in the widthwise direction thereof. The second cover plate 53 is supported by the L-shaped guide rails 51 and 51' of the first cover plate 50 and is provided with a round hole 54 through which a select lever passes.

Accordingly, the guide groove can be covered by the first cover plate 50 and the second cover plate 53, regardless of the location of the shift lever.

However, when the second cover plate is operated, the second cover plate rubs the lower surface of the first cover plate so as to cause friction noise, and it also generates particulates.

SUMMARY OF THE INVENTION

The present invention has been made in an effort to solve the above problems of the prior art.

It is an object of the present invention to provide a slide cover unit of a shift lever assembly for an automatic transmission that minimizes friction between first and second cover plate plates so as to prevent friction noise and drag from being generated.

To achieve the above object, a slide cover unit of a dual mode shift lever assembly for covering a guide groove formed in an indicator panel in order to isolate an interior of a housing regardless of movement direction of the shift lever comprises a first cover plate slidably mounted under the indicator panel for covering the guide groove, a pivot pin fixed on a lower surface of the first cover plate, and a second cover plate pivotally mounted on the pivot pin as an auxiliary cover for the guide groove.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION

A preferred embodiment of the present invention will be described hereinafter with reference to the accompanying drawings.

Figure 1:
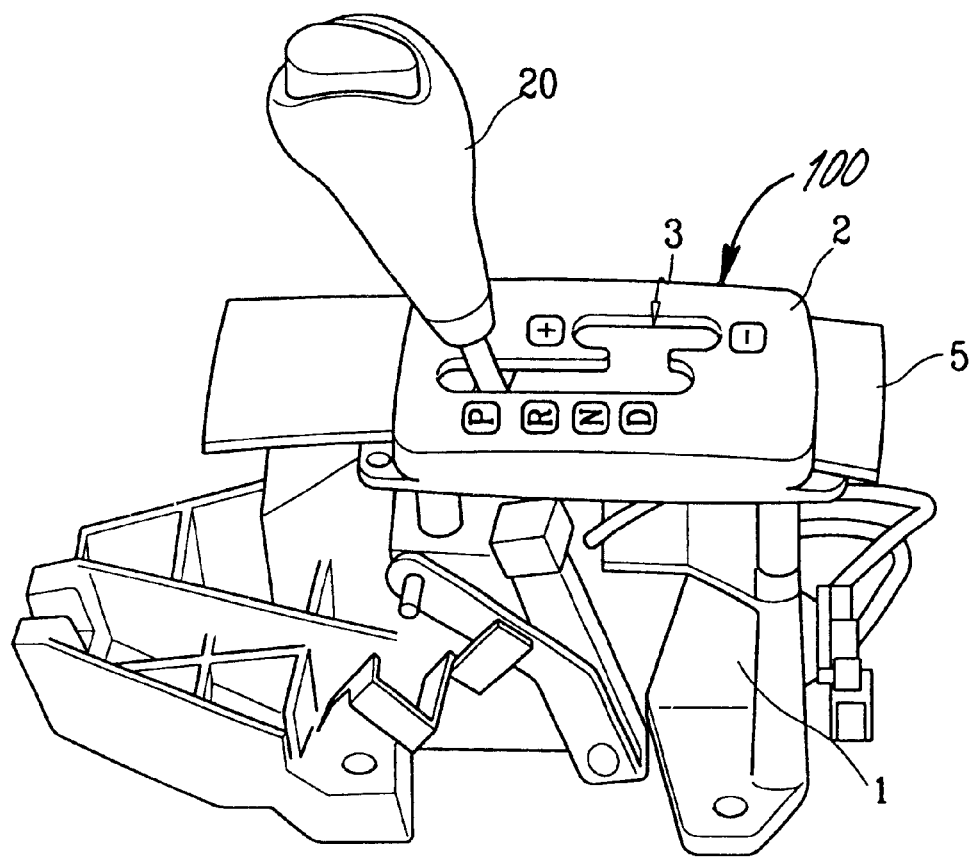
FIG. 1 is a perspective view showing a dual mode shift lever assembly according to a preferred embodiment of the present invention.

As shown in FIG. 1, a shift lever assembly 100 comprises a body 1, an indicator panel 2 mounted on a top portion of the body 1, the indicator panel 2 having guide groove 3, and a shift lever 20 pivotally fixed in the body 1 and extended outward through the guide groove 3.

The guide groove 3 comprises an auto mode portion and manual mode portion formed in a longitudinal direction with respect to the direction of travel of the vehicle, and the two mode portions are connected to each other by a channel formed in the transverse direction with respect to the direction of travel of the vehicle such that the shift lever can move to the front, rear, left, and right directions of the vehicle along the guide groove. The channel connecting the auto mode portion and the manual mode portion of the guide groove 3 if formed in a portion indicating a D range on the indicator panel 2.

Figure 2:
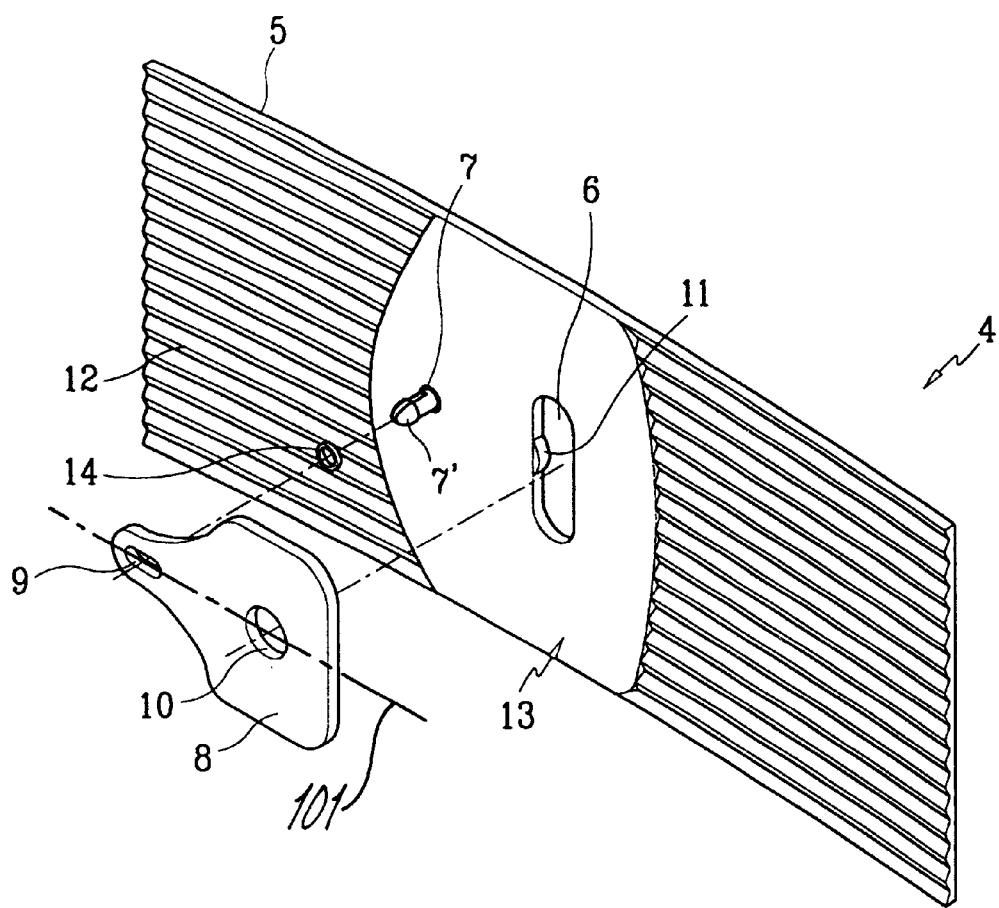
FIG. 2 is an exploded view of a slide cover unit of the dual mode shift lever assembly of FIG. 1.

The guide groove 3 is covered by a slide cover unit 4. As shown in FIG. 2, the slide cover unit 4 comprises a first cover plate 5 slidably mounted under the indicator panel 2, and a second cover plate 8 pivotally mounted on the lower surface of the first cover plate 5.

The first cover plate 5 is rectangular with the longer side oriented in a front and rear direction of the vehicle, and it has an elongated mode conversion hole 6 in the approximate center thereof, the elongation being in a widthwise direction of the first cover plate 5. On the lower surface of the first cover plate 5, a pivot pin 7 is fixed at a portion remote from the mode conversion hole 6 along the longitudinal centerline 101. The pivot pin 7 is provided with a bulbous pin head 7' at its free end and split in longitudinal direction such that the pivot pin 7 is inserted in a hole of which the diameter is smaller than that of the bulbous portion of the pivot pin 7.

The second cover plate 8 is formed with a shape of a spatula and provided with a lever receiving hole 10 and a pin hole 9 at a narrow end portion of the second cover plate 8. The pin hole 9 is elongated in a longitudinal direction of the first cover plate 5 such that the second cover plate 8 can move a small amount in a frontward and rearward direction on the first cover plate 5 after the second cover plate 8 is mounted to the first cover plate 5.

Figure 3:
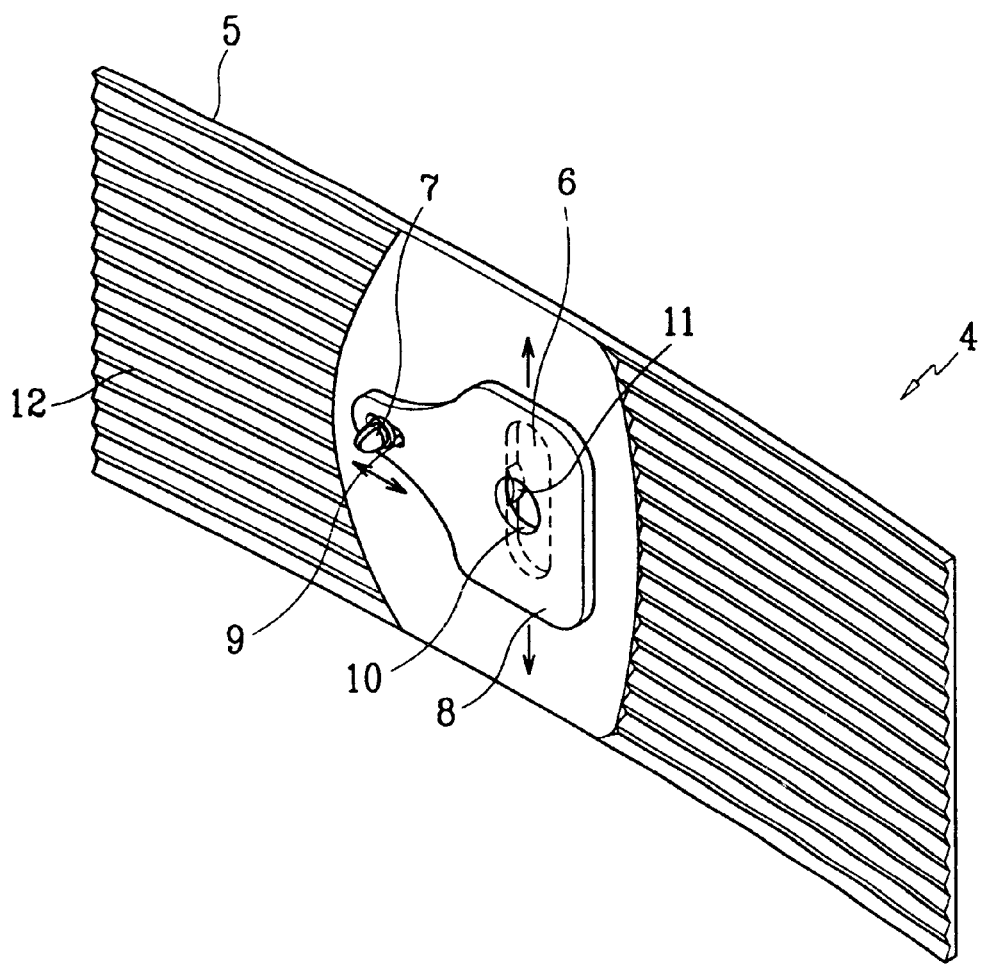
FIG. 3 is a perspective view of the slide cover unit of FIG. 2 as assembled.
Figure 4:
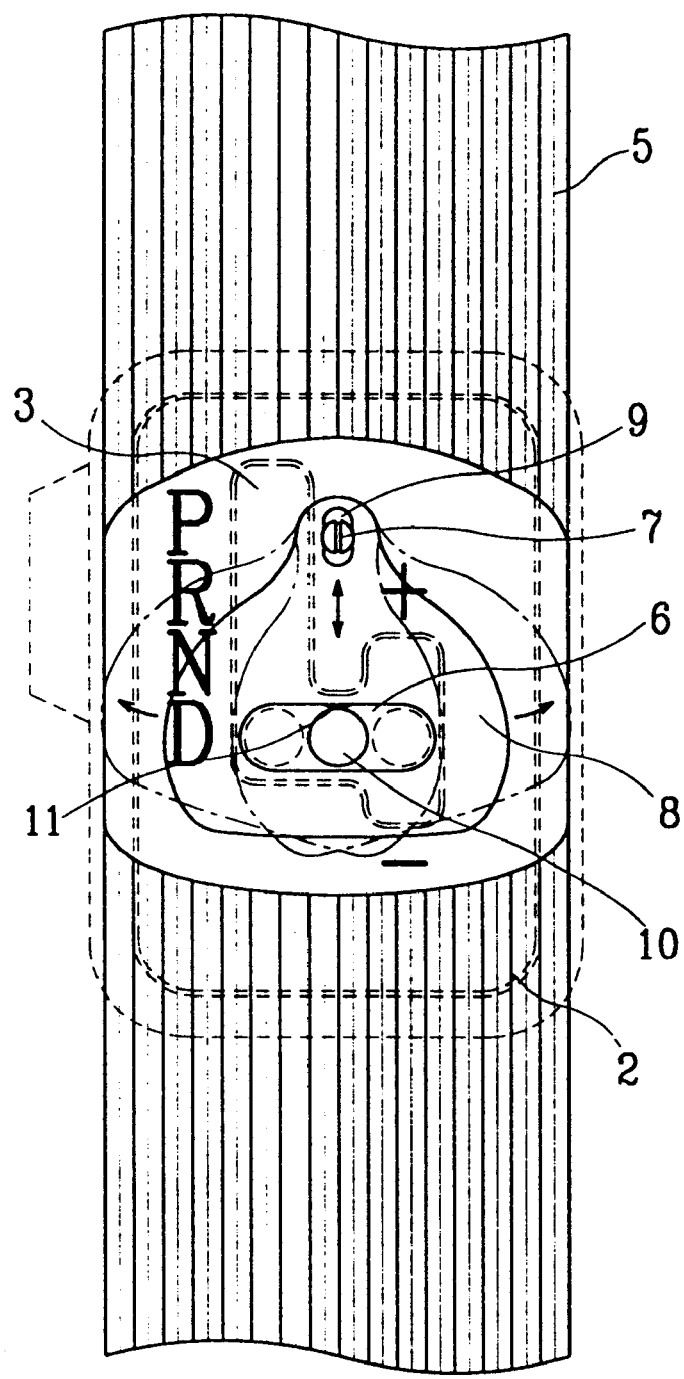
FIG. 4 is a top plane view showing the slide cover unit of FIG. 2.

As shown in FIG. 3, the second cover plate 8 is pivotally mounted on the lower surface of the first cover plate 5 so as to remain attached thereto, by inserting the pivot pin 7 of the first cover plate into the pin hole 9 of the second cover plate 8. The bulbous pin head 7' of the pivot pin 7 prevents the second cover plate 8 from releasing from the first cover plate 5.

The lower surface of the first cover plate 5 is corrugated in a longitudinal direction, except for an approximate central area thereof, for enhancing its sliding movement. The non-corrugated area is defined by the pivoting rotation of the second cover plate 8 on the pivot pin 7 such that movement of the second cover plate 8 is not interfered with by the corrugated surface. Furthermore, a rotation ring 14 (see FIG. 2) is interposed between the first and second cover plates 5 and 8 for reducing rotational friction when the pivot pin 7 is inserted into the pin hole 9. The second cover plate 8 rotates on the pin 7 of the first cover plate 5 according to a movement of the shift lever 20.

The shift lever 20 passes through the mode conversion hole 6 of the first cover plate 5 and the lever receiving hole 10 of the second cover plate 8 such that the slide cover unit 4 moves to the front, rear, left, and right directions according to the shift lever manipulation.

To enhance a detent quality when converting from one mode to the other, a detent projection 11 can be formed on a wall of the mode conversion hole 6 (see FIG. 2).

The operation of the slide cover unit of the shift lever assembly according to a preferred embodiment of the present invention will be described hereinafter.

Shifting operations are made by moving the shift lever 20 along the guide groove 3. When the shift lever 20 moves in the longitudinal direction of the vehicle, the first cover plate 5 is moved together with the second cover plate 8 in the same direction. On the other hand, when the shift lever 20 moves in the transverse direction of the vehicle for changing shift mode, the shift lever 20 moves in the longitudinal direction of the elongated mode conversion hole 6 and the second cover plate 8 rotates on the axis of the pivot pin 7 and moves in the same direction of the shift lever 20. Accordingly, the guide groove 3 is covered by the slide cover unit 4 under the indicator panel 2 regardless of movements of the shift lever.

Figure 5:
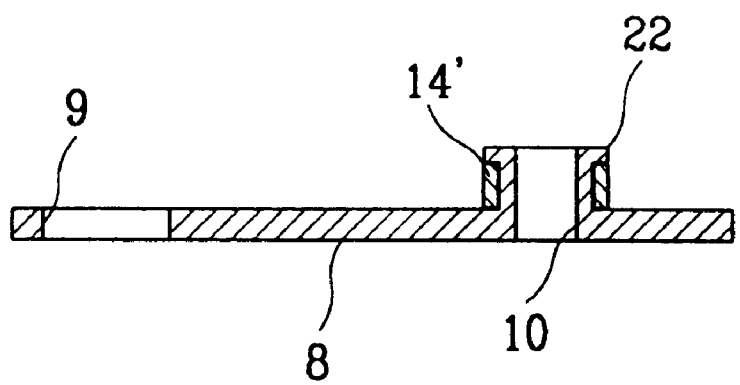
FIG. 5 is a front cross-sectional view taken along a longitudinal axis of an alternative second cover plate according to a second preferred embodiment of the present invention.

FIG. 5 is a front cross-sectional view showing a second cover plate according to a second preferred embodiment of the present invention.

As shown in FIG. 5, a guide projection 22 is formed upward around the pin hole 10 such that the guide projection 22 is inserted into the mode conversion hole 6 of the first cover plate 5. The guide projection 22 has a flange around the edge of the upper end thereof and a rotation ring 14' for reducing friction between the first and second cover plates 5 and 8, and it is provided around the guide projection 22.

Figure 6:
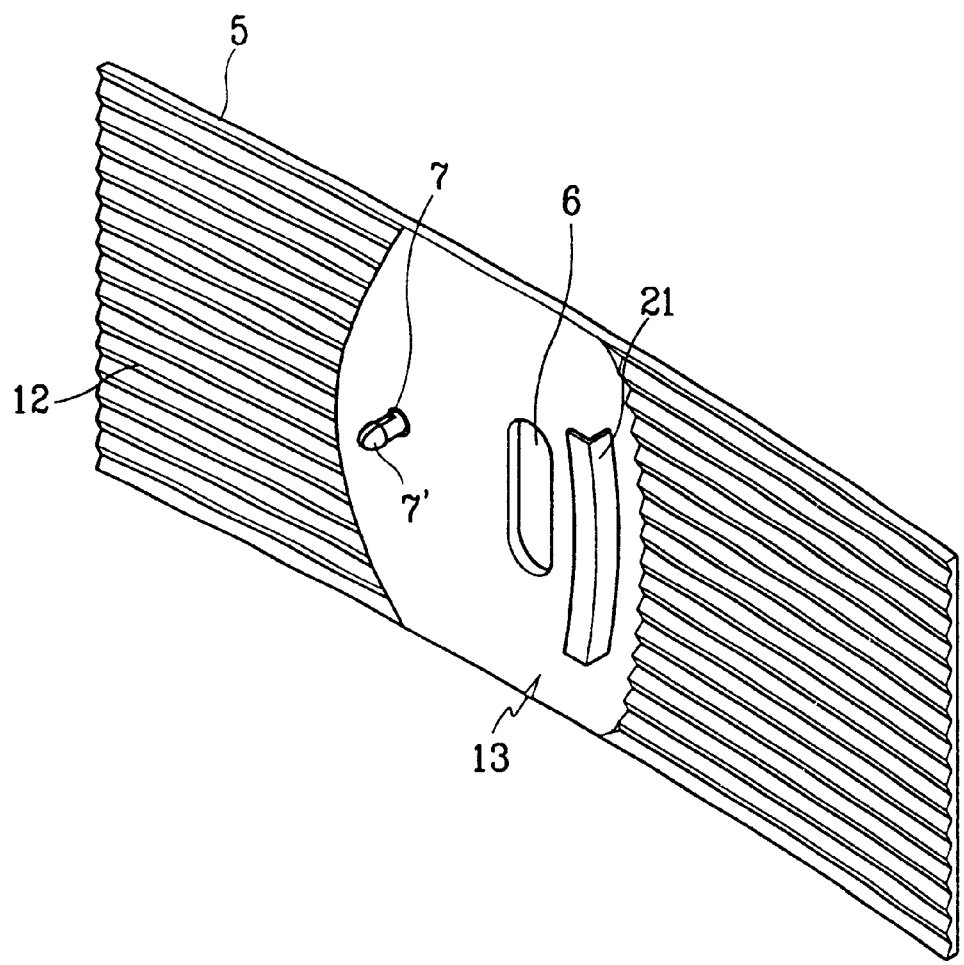
FIG. 6 is a perspective view showing a bottom surface of a first cover plate plate according to the second preferred embodiment of the present invention.
Figure 7:
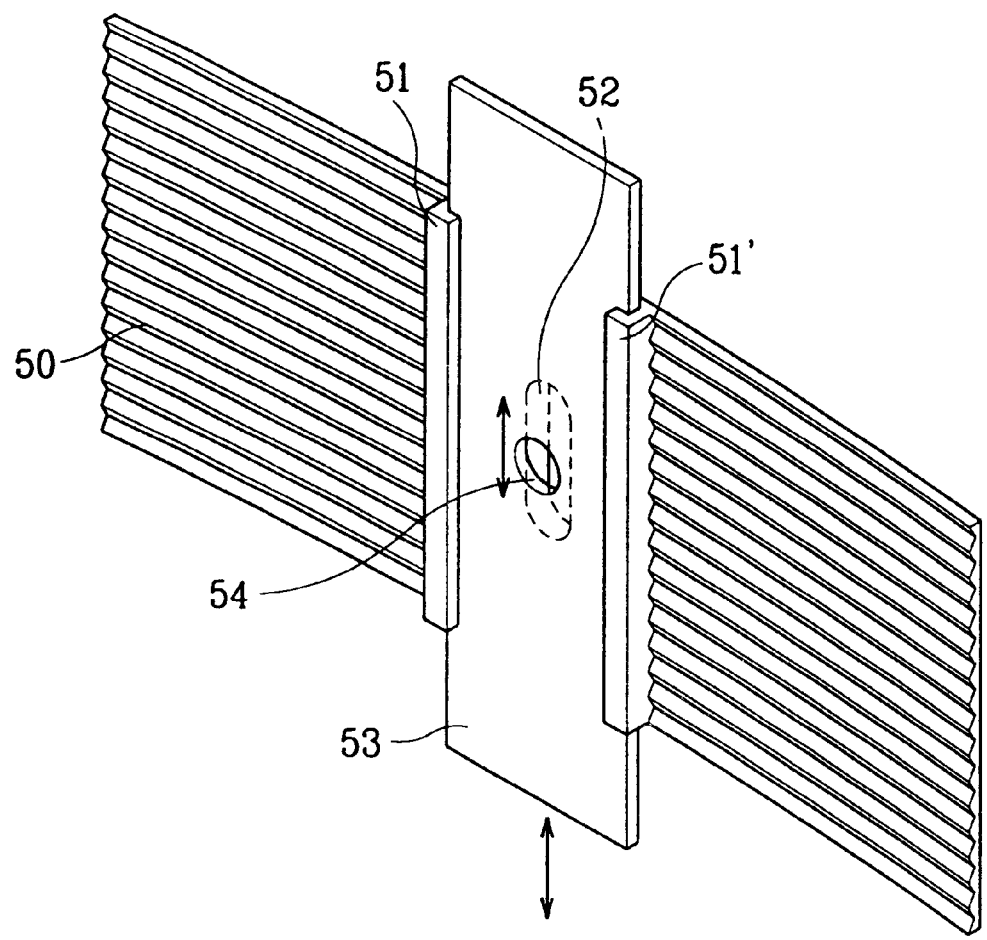
FIG. 7 is a perspective view showing a prior art slide cover unit.

FIG. 6 is a perspective view showing a bottom surface of a first cover plate according to the second preferred embodiment of the present invention.

As shown in FIG. 6, in addition to the first cover plate unit, the first cover plate further comprises a support rail 21 formed on the lower surface of the first cover plate 5 for supporting the second cover plate 8.

The operation of the slide cover unit of the shift lever assembly according to the second preferred embodiment of the present invention is the same as that of the first preferred embodiment.

As described above, the second cover plate is formed with a spatula shape small enough not to project out from under the first cover plate and is pivotally mounted on the lower surface of the first cover plate such that the friction area between the first and second cover plates is minimized, and so the second cover plate does not interfere with any operation of other parts of the shift lever assembly. Also, the minimization of the friction area between the first and second cover plates reduces friction noise and generation of particulates.

What is claimed is:

1. A slide cover unit of a dual mode shift lever assembly having a shift lever moving along a guide formed in an indicator panel, the unit comprising:

a first cover plate slidably mounted under the indicator panel for covering the guide groove;

a pivot pin fixed on a lower surface of the first cover plate; and a second cover plate pivotally mounted on the pivot pin as a auxiliary cover for the guide groove;

wherein the first cover plate has a mode conversion hole at a center thereof, the mode conversion hole being elongated in a widthwise direction; wherein the shift lever penetrates the mode conversion hole; and wherein the first cover plate is provided with a detent projection formed on a wall of the mode conversion hole.

2. A slide cover unit of claim 1 wherein the second cover plate is provided with a guide projection formed upward around the lever receiving hole such that the guide projection is inserted into the mode conversion hole of the first cover plate.

3. A slide cover unit of a dual mode shift lever assembly having a shift lever moving along a guide groove formed in an indicator panel, the unit comprising:

a first cover plate slidably mountable under the indicator panel for covering the guide groove;

a pivot pin fixed on a lower surface of the first cover plate; and a second cover plate pivotally mounted on the pivot pin as an auxiliary cover for the guide groove;

wherein the pivot pin has a bulbous pin head at its free end and a split in a longitudinal direction for preventing the second cover plate from releasing from the first cover plate.

4. A slide cover unit of a dual mode shift lever assembly having a shift lever moving along a guide groove formed in an indicator panel, the unit comprising:

a first cover plate slidably mounted under the indicator panel for covering the guide groove, the cover plate having a lower surface;

a pivot pin fixed on the lower surface on the first cover plate; and a second cover plate pivotally mounted on the pivot pin as an auxiliary cover for the guide groove;

wherein the lower surface of the first cover plate is corrugated in a longitudinal direction, except for a central area which is defined by a pivoting rotation of the second cover plate.

5. A slide cover unit of a dual mode shift lever assembly having a shift lever moving along a guide groove formed in an indicator panel, the unit comprising:

a first cover plate slidably mounted under the indicator panel for covering the guide groove;

a pivot pin fixed on a lower surface of the first cover plate; and a second cover plate pivotally mounted on the pivot pin as an auxiliary cover for the guide groove;

wherein the pivot pin is provided with a rotation ring to facilitate smooth rotation of the second cover plate.

* * * * *